Patented Nov. 25, 1924.

1,517,221

UNITED STATES PATENT OFFICE.

GEORGE J. MEAD, OF CHICAGO, ILLINOIS, AND CLEMENT A. ROSSBACH, OF MILWAUKEE, WISCONSIN, ASSIGNORS TO THE FISK RUBBER COMPANY, OF CHICOPEE FALLS, MASSACHUSETTS, A CORPORATION OF MASSACHUSETTS.

PROCESS OF RECLAIMING RUBBER MATERIALS AND THE PRODUCT.

No Drawing.  Application filed May 3, 1922. Serial No. 558,284.

*To all whom it may concern:*

Be it known that we, GEORGE J. MEAD, a citizen of the United States, and a resident of Chicago, in the county of Cook and State of Illinois, and CLEMENT A. ROSSBACH, a citizen of the United States, and a resident of Milwaukee, in the county of Milwaukee and State of Wisconsin, have invented certain new and useful Improvements in Processes of Reclaiming Rubber Materials and the Product, of which the following is a specification.

It has been proposed to form a raw material by shredding unvulcanized rubberized fibrous material such as fabric or cotton batting and it has been found that such a raw material may be produced at a low cost. We have found that we may produce a similar material at an even lower cost and we describe herein for purposes of illustration one method by which our material may be produced.

According to this illustrative method vulcanized rubberized fibrous material is shredded in any suitable manner as by passing it successively through a cracker and the free rubber separated from the rubberized fibrous material in any suitable manner as by passing the mixture before a fan which will blow out the lighter fibrous material after which the free rubber may be devulcanized to form a high grade stock. The shredded fibrous material is then devulcanized and placed on a mixing mill where it is first dried and then mixed with such other ingredients as may be desired in the raw material. In actual practice we find it expedient to add a binder such as a tar and also a certain amount of unvulcanized rubber and of course the usual vulcanizing agents and in certain cases a small percentage of lime. After the material is taken from the mixer it may be formed into the desired shape in any suitable manner and vulcanized.

We find, however, that if this material is passed through a calender the calendering operation tends to align the shreds of fibrous material in the direction of the length of the calendered sheet and in cases where it is desirable that the article possess a higher tensile strength in one direction it is desirable to calender the stock in this manner. In other cases where it is desired that the tensile strength be substantially uniform in all directions several plies of calendered stock may be laid up with their fibres at different angles or the stock may be formed without calendering.

In material formed as above set forth the fibrous content is perhaps more thoroughly impregnated with the rubber than in similar material formed from unvulcanized fibrous material and accordingly the raw material formed by our process is perhaps stronger than that formed by the processes heretofore proposed. In any event we find this material extremely satisfactory for a great variety of articles and particularly for treads such as matting, soles, heels, hoof-pads, solid tires, and the tread portions of pneumatic tires.

We have described herein one process by which our material may be formed and have indicated a possible advantage of this material over similar material formed from previously unvulcanized fibrous material and have also indicated some of the uses to which our material may be put. This entire disclosure, however, is illustrative only and our invention is, of course, not limited thereto.

We claim:

1. The method of preparing a raw material which comprises shredding vulcanized rubberized fibrous material, separating out the free rubber, devulcanizing the vulcanized rubberized fibrous material, and adding unvulcanized rubber.

2. The method of preparing a raw material which comprises shredding vulcanized rubberized fibrous material, separating out the free rubber, devulcanizing the vulcanized rubberized fibrous material, adding unvulcanized rubber, and calendering to align the fibres.

3. A raw material comprising shredded devulcanized rubberized fabric from which the surplus rubber has been removed.

4. A raw material comprising shredded devulcanized rubberized fabric from which the surplus rubber has been removed and unvulcanized rubber added.

In testimony whereof we have signed our names to the above specification.

CLEMENT A. ROSSBACH,
GEORGE J. MEAD.